United States Patent [19]

Roberts

[11] Patent Number: 4,838,463
[45] Date of Patent: Jun. 13, 1989

[54] DECANTER WITH MOLDED INTERLOCKING HANDLE

[75] Inventor: Melvin F. Roberts, Niles, Ill.

[73] Assignee: Bloomfield Industries, Inc., Chicago, Ill.

[21] Appl. No.: 38,642

[22] Filed: Apr. 15, 1987

[51] Int. Cl.[4] .............................................. A47G 19/14
[52] U.S. Cl. ................................. 222/465.1; 222/570; 285/331
[58] Field of Search ............... 222/475, 570, 569, 542; 285/331, DIG. 915, 284

[56] References Cited

U.S. PATENT DOCUMENTS

| | | | |
|---|---|---|---|
| 3,491,924 | 1/1970 | Bloomfield et al. | 222/475.1 |
| 3,615,045 | 10/1971 | Fiorini | 222/475.1 |
| 4,090,648 | 5/1978 | Roberts | 222/570 X |
| 4,256,333 | 3/1981 | Jones | 285/331 X |

FOREIGN PATENT DOCUMENTS 226746  6/1969  Sweden .............................. 222/569

Primary Examiner—Joseph J. Rolla
Assistant Examiner—Gregory L. Huson
Attorney, Agent, or Firm—Lee & Smith

[57] ABSTRACT

An improved decanter vessel formed of a rigid receptacle and a pouring spout unit permanently engaged about the neck of the receptacle. The pouring spout unit has formed therein an internal annular cavity shaped to accommodate the neck of the receptacle. The receptacle and pouring spout unit are joined by a flexible material which surrounds the neck portion of the receptacle forming a mechanical lock between the neck portion and the pouring spout unit. During assembly of the decanter, the flexible material is in a liquid state to facilitate joining of the receptacle and the pouring spout unit and assure that the material evenly and completely surrounds the neck and fills the annular cavity. The flexible material solidifies after assembly of the decanter vessel.

9 Claims, 1 Drawing Sheet

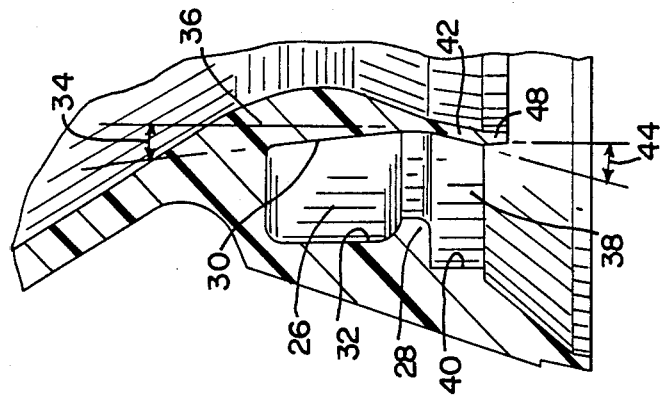
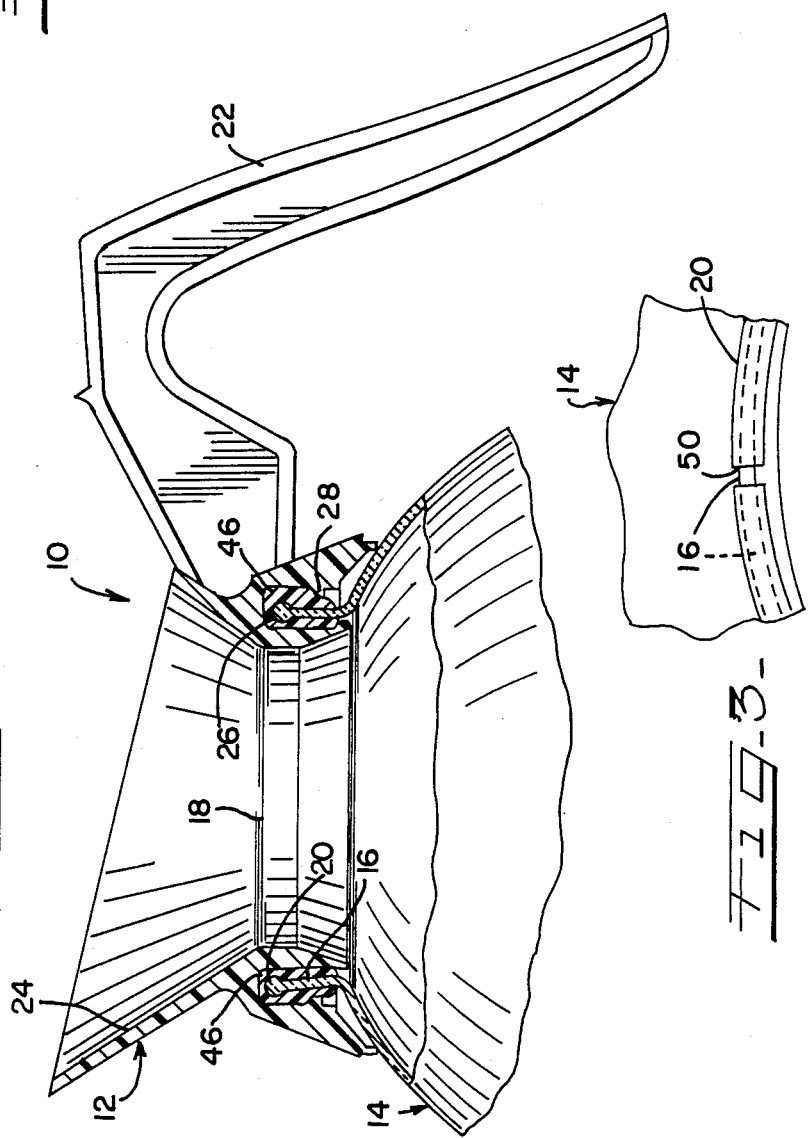

DECANTER WITH MOLDED INTERLOCKING HANDLE

BACKGROUND OF THE INVENTION

This invention relates to decanter vessels for containing and dispensing liquids, and more particularly to an improved decanter vessel formed of a unitary pouring spout bonded to a rigid glass or plastic receptacle. Such decanter is particularly useful for dispensing hot liquids, such as coffee.

In my U.S. Pat. No. 4,090,648, issued May 23, 1978, I describe a new decanter vessel having a molded pouring spout unit which is matingly affixed to an upstanding neck portion of the receptacle. That decanter vessel has proven to be a substantial commercial success and many millions of the decanter vessels have been sold world wide.

This invention comprises an improvement over that of my U.S. Pat. No. 4,090,648. It has been discovered that, at times, during the assembly of my decanter vessel, due to the nature of the cavity for the hot-melt material, material can inadvertently be extruded from the cavity into the bowl of the receptacle, producing an unacceptable product. Also, due to the shape of the cavity formed in the pouring spout unit, the decanter vessel is somewhat susceptible to twisting tensions which tend to loosen the pooring spout unit from the rigid receptacle. A large cavity which is spaced farther from the outlet in the pouring spout unit would tend to strengthen the pouring spout unit and also strengthen the mechanical bond between the pouring spout unit and the rigid receptacle.

SUMMARY OF THE INVENTION

The improved decanter vessel according to the invention comprises two basic components, a rigid receptacle having an integral neck portion formed thereon, and a pouring spout unit having formed therein a continuous cavity shaped to freely accommodate the neck portion without stress. The width of the cavity is greater than the thickness of the neck portion, forming a gap between the neck portion and the wall of the cavity. Flexible means joins the rigid receptacle and the pouring spout unit into the decanter vessel, forming a mechanical lock and also a fluid seal between the receptacle and the pouring spout unit. A trough extends coterminally with the cavity to form an overflow receptacle for the flexible means during formation of the decanter vessel.

In accordance with the disclosed embodiment of the invention, the trough includes means for enhancing the mechanical lock between the neck portion and the pouring spout unit. That enhancing means comprises one of the walls of the trough which extends at an angle into the trough. It has been found that the angle of extension of the wall is optimally approximately 7°, sufficient to increase the mechanical lock yet small enough to avoid interference with assembly of the decanter vessel. An edge portion is formed on the angled wall extending at a second angle away from the trough to deepen the trough yet avoid interference between the receptacle and the pouring spout unit during assembly.

The neck portion is a generally annular protrusion extending from the receptacle, and the cavity is of annular configuration and is shaped to surround the neck portion when the decanter vessel is assembled. The cavity includes spaced inner and outer walls forming the cavity, with the inner wall being inclined into the the cavity. To enhance the mechanical lock between the neck portion and the pouring spout unit, an annular protrusion is formed within the inner margin of the cavity to coact with the flexible means. In accordance with the illustrated embodiment of the invention, the protrusion extends inwardly from the outer wall.

It has been found that the hot-melt materials available to form the flexible means joining the two components of the decanter vessel typically adhere rather poorly to either the rigid receptacle or the molded pouring spout unit. If the pouring unit is formed of a molded plastic, the upstanding neck portion of the pouring spout unit is rather regular in its thickness and configuration, and if the flexible means does not adhere thereto, the pouring spout unit can become loosened sufficiently to rotate about the upstanding neck portion. Therefore, in accordance with one embodiment of the invention, the neck portion includes a plurality of spaced, radial notches which form an additional lock between the pouring spout unit and the rigid receptacle after the flexible means has solidified.

BRIEF DESCRIPTION OF THE DRAWINGS

The invention is described in greater detail in the following description of examples embodying the best mode of the invention, taken in conjunction with the drawing figures, in which:

FIG. 1 is a cross-sectional view of the upper portion of a decanter vessel according to the invention, FIG. 2 is an enlarged fragmentary cross-sectional view of a portion of the pouring spout unit of the decanter vessel of FIG. 1, and FIG. 3 is an enlarged fragmentary top view of the neck portion of an embodiment of the rigid receptacle having a radial notch formed therein for enhancing the mechanical interlock between the pouring spout unit and the rigid receptacle.

DESCRIPTION OF EXAMPLES EMBODYING THE BEST MODE OF THE INVENTION

As illustrated in the drawings, a decanter vessel 10 is composed of two basic components, a pouring spout or neckband unit 12, and a rigid receptacle 14. The receptacle 14, preferably formed of glass, plastic, or any other rigid, transparent material, has an integral upstanding neck portion or flange 16 formed thereon in a continuous and annular manner about the open top of dispensing aperture 18 of the receptacle 14. The neck portion 16 may have an enlarged integral annular bead portion 20 as illustrated, or may be formed with a generally constant thickness.

The pouring spout unit 12 is a unitary body formed of semi-rigid material, such as polypropylene. A handle 22 is affixed to the pouring spout unit 12. The handle may be a separate element, but it is preferred that the handle 22 be formed as an integral portion of the pouring spout unit 12. As is customary with with decanter vessels, an annular dispensing or pouring flange 24 is integrally formed in the pouring spout unit 12 with an extended pouring lip portion formed opposite the handle 22.

The pouring spout unit 12 has formed therein an internal annular cavity 26 which, when the decanter vessel is assembled as illustrated in FIG. 1, receives and surrounds the neck portion 16 of the rigid receptacle 14. The cavity 26 includes an annular protrusion 28 which enhances the mechanical connection between the neck portion 16 and the pouring spout unit 12 as will be further described below.

As illustrated, the annular cavity 26 of the pouring spout unit 12 is significantly wider than necessary to accommodate the neck portion 16 of the receptacle 14. This is to assure that varying diameter and varying thickness neck portions 16 can be accepted within the cavity 24. Although rigid receptacles 14 all may be formed to exactly the same specifications, due to the formulation of the material of such receptacles and conditions which exist as they are formed, a substantial variation in the size of the neck portion 16 can be expected, particularly when the receptacle is formed of glass.

As best shown in FIG. 2, the annular cavity has spaced respective inner and outer walls 30 and 32. The protrusion 28 extends inwardly into the cavity 26 from the outer wall 32. The inner wall 30 is formed at an angle to the vertical, the angle being designated 34 in FIG. 2. By having the inner wall 30 inclined at the angle 34 illustrated, the adjacent material 36 of the pouring spout unit 12 is thickened substantially from that if the wall 30 were vertical as set forth in my U.S. Pat. No. 4,090,648. Therefore, the adjacent portion 36 is substantially strengthened from that of my previous patent.

A trough 38 is formed at the mouth of the cavity 26. The trough 38 includes a vertical outer wall 40 and an inclined inner wall 42 which extends at an angle 44 to the vertical. The inclination of the inner wall 42 serves several purposes, described below following the detailed description of the elements of my invention.

When the decanter vessel 10 is constructed as illustrated in FIG. 1, a flexible bonding material 46 completely fills the void in the annular cavity 26 and surrounds the neck portion 16 to interlockingly join the rigid receptacle 16 and the pouring spout unit 12. Preferably, the flexible material 46 is a polyamide-based material which has some degree of adherency to both the rigid receptacle 14 and the pouring spout unit 12, and yet is flexible enough to endure a wide variation of ambient temperatures. The flexible bonding material 46 provides a cushion to prevent the pouring spout unit 12 from breaking the neck portion 16 from the rigid receptacle 14 as the pouring spout unit 12 and the neck portion 16 expand and contract relative to one another with temperature variations. Furthermore, the flexible material 46 must allow ready assembly of the decanter vessel 10 in an expeditious and economical manner. While any flexible bonding material which can fill the cavity 26 can be employed so long as it does not impart any adverse taste or odor to the liquid dispensed from the decanter vessel 10, I have investigated a number of materials thus far and have found that only polyamide-based materials satisfy the fairly stringent requirements set forth above. One such material found particularly suitable is No. 6300 polyamide hot melt, manufactured by Henkel Adhesives Company. Another, as set forth in my U.S. Pat. No. 4,090,648, is the "Jet-Melt" hot-melt adhesive manufactured by the Minesota Mining & Manufacturing Company.

An annular extending edge 48 extends downwardly from the inner wall 42 as best shown in FIG. 2. The extending edge 48 is oriented at a second angle from the trough 38 so as to avoid interference with the neck portion 16 during assembly of the decanter vessel 10, yet still form a wall for properly containing the flexible bonding material 46 within the cavity 26 and trough 38 during the forming procedure.

Typical dimensions of the cavity 26 and trough 38 are set forth in the following table of dimensions:

| Table Of Dimensions | |
| --- | --- |
| Angle 34 | 6° |
| Angle 44 | 7° |
| Depth of cavity 36 | .406" |
| Maximum width of cavity 26 | .274" |
| Extent of protrusion 28 | .051" |
| Depth of trough 38 plus edge 48 | .1875" |

As explained above, most rigid receptacles 14 are formed of glass. Glass varies widely in its dimensions, and normally the bead portion 20 varies considerably in diameter. Furthermore, the annular bead portion 20 of a glass receptacle tends to have surface irregularities and variations in thickness which form a mechanical interlock with the bonding material 46. Thus, not only does the bead portion 20 enhance mechanical lock because of its increased diameter in relation to the thickness of the neck portion 16, but also, because of the varying diameters and the surface irregularities and variations in thickness of the bead portion 20 a mechanical lock is formed to resist rotation of the pouring spout unit 12 on the neck portion 16 should any adhesive bond between the flexible bonding material 46 and the neck portion 16 be broken. On the other hand, if the bead portion 20 is substantially regular in diameter and smooth, or if the rigid receptacle 14 is formed of a molded plastic material that typically has a very smooth and consistant diameter of the bead portion 20, it is ordinarily necessary to periodically notch the bead portion 20 to enhance the anti-rotational mechanical lock. As shown in FIG. 3, the bead portion 20 in this instance is provided with a series of spaced, radial notches 50. During the assembly process, the flexible bonding material 46 will enter the notches 50, thus precluding the possibility of rotation of the pouring spout unit 12 on the rigid receptacle 14.

Normally, the decanter vessel 10 is asembled in the inverted orientation from that shown in FIGS. 1 and 2. During assembly, the internal annular cavity 26 of the pouring spout unit 12 is first filled with a liquified flexible bonding material 46. Immediately thereafter, the neck portion 16 of the rigid receptacle 14 is inserted into the cavity 26. The bonding material 46 flows about the neck portion 16, being displaced as necessary to accommodate the volume of the inserted neck portion 16. Thus, as shown in FIG. 1, in the solidified state, the bonding material 46 typically extends beyond the mouth of the cavity 26 as defined by the inwardly extending protrusion 28.

During the formation process, the decanter vessel 10 is maintained in the inverted orientation until the flexible bonding material 46 has solidified. At that time, the decanter vessel 10 is reinverted and is ready for use without any further manufacturing steps. In addition, the inwardly extending inner wall 42 tends to aid the trapping of any flexible bonding material 46 that has not solidified sufficiently when the decanter vessel 10 is reinverted during the forming process, preventing the bonding material 46 from dripping into the interior of the rigid receptacle 14.

To assure a rigid yet flexible interconnection between the pouring spout unit 12 and the rigid receptacle 14, the neck portion 16 of the receptacle 14 is preferably provided with the enlarged bead 20. In addition, the internal annular cavity 26 is provided with the annular protrusion 28 so that when the flexible material 46 has solidified in the cavity 26, the enlarged bead 20 and the protrusion 28 cooperate to assure a strong mechanical lock between the rigid receptacle 14 and the pouring spout unit 12. The inward inclination of the inner wall 42 further enhances the mechanical lock. Thus, even if a strong adhesive bond is not formed between the flexible bonding material 46 and either the rigid receptacle 14 or the pouring spout unit 12, the spout unit and the rigid receptacle will be firmly interlocked to prevent their separation.

ACHIEVEMENTS

The present invention, while broadly similar to that disclosed in my U.S. Pat. No. 4,090,648, includes several features which produce substantial advantages over those of my previous patent. Unlike my previous patent, I include no locking channel, but rather provide only the extended protrusion 28. I therefore can introduce more flexible bonding material 46 into the cavity 26, producing a stronger connection. The larger cavity 26 also accommodates the flexible bonding material 46 better during the forming process and provides a greater mass of bonding material, which tends to stiffen better because there is more material disposed about the upstanding neck portion 16 when the decanter vessel 10 has been assembled. Because the pouring spout unit 12, which typically is manufactured of polypropylene, tends to soften at higher liquid temperatures, the larger mass of the bonding material 46 creates a better mechanical bond between the pouring spout unit 12 and the rigid receptacle 14.

The inner wall 30 is no longer vertical as that in my U.S. Pat. No. 4,090,648. The in-turn of the wall 30 thickens the adjacent material 36 from that in my U.S. Pat. No. 4,090,648, strengthening the pouring spout unit 12 at a critical location, reducing the flexibility of the adjacent material 36, and therefore enhancing the mechanical bond between the pouring spout unit 12 and the rigid material 14.

The trough 38 permits more bonding material 46 to be introduced than that possible in my previous U.S. Pat. No. 4,090,648. Also, because the inner wall 42 is turned inwardly at a 7° angle to the vertical, not only does the wall 42 enhance the mechanical lock, but also the wall 42 prevents any still-flowing bonding material 46 from dripping into the interior of the decanter vessel 10 when it is reinverted during the forming process. Also, with the extension of the inner wall and its extending edge 48, any flexible bonding material 46 displaced during introduction of the rigid receptacle into the pouring spout unit will be contained and will not tend to be displaced over the edge of the cavity 26, as can occur during assembly of the decanter vessel of my previous U.S. Pat. No. 4,090,648.

Various changes can be made to the invention without departing from the spirit thereof or scope of the following claims.

What is claimed is:
1. A decanter vessel comprising:
   a. a rigid receptacle having a central axis and having an integral neck portion formed thereon about said central axis,
   b. a pouring spout unit concentrically located on said neck portion and having formed therein a continuous cavity shaped to freely accommodate said neck portion without stress, the width of said cavity being greater than the thickness of said neck portion, forming a gap between said neck portion and the wall of said cavity,
   c. flexible means joining said rigid receptacle and said pouring spout unit, said flexible means
      (i) generally surrounding said neck portion within said cavity and substantially filling the remainder of said cavity unoccupied by said neck portion.
      (ii) adhering to said neck portion and said pouring spout unit, forming a mechanical lock therebetween and sealing the gap between the neck portion of the rigid receptacle and pouring spout unit to prevent liquid flow therebetween, and
   d. a trough extending coterminally with said cavity, said trough spanning opposite sides of said neck portion and forming an overflow receptacle for said flexible means when liquid, during formation of said decanter vessel, said trough being of decreasing dimension in a direction away from said cavity, enhancing the mechanical lock between the neck portion and said pouring spout unit.

2. A decanter vessel according to claim 1 wherein said decreasing dimension of said trough is defined by a wall of said trough angled at approximately 7° to said central axis.

3. A decanter vessel according to claim 2 in which said wall includes an edge portion extending at a second angle away from said trough.

4. A decanter vessel according to claim 1 in which said neck portion is a generally annular protrusion extending from said receptacle, and said cavity is of annular configuration and shaped to surround said neck portion.

5. A decanter vessel according to claim 4 in which said cavity includes spaced inner and outer walls forming said cavity, said inner wall being inclined into said cavity.

6. A decanter according to claim 4 in which said neck portion includes external irregularities which coact with said flexible means to strengthen the mechanical lock between said neck portion and said spout unit.

7. A decanter vessel according to claim 4 in which said neck portion includes a plurality of spaced, radial notches.

8. A decanter vessel according to claim 4 including an annular protrusion formed within the inner margin of said cavity to coact with said flexible means to strengthen the mechanical lock between said neck portion and said spout unit.

9. A decanter vessel according to claim 8 in which said cavity includes spaced inner and outer walls forming said cavity, and said protrusion extends from said outer wall.

* * * * *

UNITED STATES PATENT AND TRADEMARK OFFICE
CERTIFICATE OF CORRECTION

PATENT NO. : 4,838,463

DATED : June 13, 1989

INVENTOR(S) : Melvin F. Roberts

It is certified that error appears in the above—identified patent and that said Letters Patent is hereby corrected as shown below:

In Column 1, line 29, please delete the word "large" and insert therefor - - larger - -.

Signed and Sealed this

Eighth Day of May, 1990

Attest:

HARRY F. MANBECK, JR.

*Attesting Officer*     *Commissioner of Patents and Trademarks*